(12) United States Patent
Chua et al.

(10) Patent No.: US 6,319,450 B1
(45) Date of Patent: Nov. 20, 2001

(54) ENCAPSULATED CIRCUIT USING VENTED MOLD

(75) Inventors: Kok Hua Chua; Ching Meng Fang; Kim Hwee Tan, all of Singapore (SG)

(73) Assignee: Agere Systems Guardian Corp., Orlando, FL (US)

( * ) Notice: Subject to any disclaimer, the term of this patent is extended or adjusted under 35 U.S.C. 154(b) by 0 days.

(21) Appl. No.: 09/351,945

(22) Filed: Jul. 12, 1999

(51) Int. Cl.$^7$ .......................... B29C 33/10; B29C 70/70; B29C 45/34
(52) U.S. Cl. ...................... 264/272.17; 425/812; 257/787
(58) Field of Search ..................... 257/788, 787, 257/499; 264/272.11, 272.15, 272.17, 102; 425/812, 116

(56) References Cited

U.S. PATENT DOCUMENTS

| | | | |
|---|---|---|---|
| 5,137,479 | * 8/1992 | Ohikata et al. | 264/272.17 |
| 5,293,065 | 3/1994 | Chan | 257/667 |
| 5,665,296 | * 9/1997 | Jain et al. | 264/272.15 |
| 5,961,912 | * 10/1999 | Huang et al. | 264/272.17 |
| 6,007,317 | * 12/1999 | Mess | 425/812 |

* cited by examiner

*Primary Examiner*—Angela Ortiz
(74) *Attorney, Agent, or Firm*—Duane, Morris & Heckscher, LLP

(57) ABSTRACT

A mold has at least one vent hole formed in the mold. The vent hole is positioned to allow egress of air from the mold. The vent hole has an inside end and an outside end. The vent hole has a cross section that increases in area from the inside end to the outside end. The vent hole may have a shape of a trapezoidal prism, a truncated pyramid or a truncated cone; the cross section of the vent hole may be a rectangle. A preferred mold has three air vent holes at three corners of the mold. An integrated circuit is placed within the mold. A material to be molded is injected into the mold to encapsulate the integrated circuit. Mold cleaning is facilitated by the shape of the vent, and plastic flashes may be easily removed through the vent hole.

4 Claims, 3 Drawing Sheets

ENCAPSULATED CIRCUIT USING VENTED MOLD

FIELD OF THE INVENTION

The present invention relates to apparatus and methods for encapsulating integrated circuits.

DESCRIPTION OF THE RELATED ART

Many techniques have been used to package integrated circuits using transfer molding equipment. These techniques include attaching an integrated circuit to a lead frame and wire bonds connecting the integrated circuit to conductive leads on the lead frame. The integrated circuit and lead frame are then placed into a mold, and an encapsulant (which may be, for example, a resin or thermoplastic molding compound) is injected into the mold cavity. Electrical components of the integrated circuit, including portions of the conductive leads, are encapsulated in the resin or molding compound. The encapsulated package is cured, deflashed and external conductive leads are prepared (trimmed, formed, coated, etc.) as required for the specific integrated circuit design. The finished product is an integrated circuit which has been encapsulated in a plastic body with electrically conductive leads extending from the plastic body.

Ideally, a molding process would provide plastic encapsulation which totally surrounds the integrated circuit and associated components with no void spaces or defects in the encapsulation. Molding processes and apparatus in the prior art have often failed to achieve this result.

U.S. Pat. No. 5,293,065 to Chan is incorporated by reference herein in its entirety. Chan describes a lead frame for an integrated electrical circuit. A plurality of elongated conductive leads extend in side by side relationship for attachment with the integrated electrical circuit. Chan's method requires a specialize lead frame. An opening includes a first slot through one portion of the lead frame, for injecting molding compound through the lead frame after the lead frame and attached integrated electrical circuit have been positioned in a mold cavity. Another opening includes a second slot through a portion of the lead frame opposite from the first slot, for air to escape from the mold cavity during injection of resin into the cavity. The second slot has a larger cross-sectional flow area as compared to the cross-sectional flow area of the first slot.

Other techniques have been developed for providing better air venting during encapsulation of integrated circuits. These techniques are better understood by reference to FIG. 1.

FIG. 1. shows a conventional air vent 20 in a corner of a mold 10. The mold 10 has a main chamber 30 that is sized for overmolding an integrated circuit (not shown in FIG. 1). As the mold 10 fills with the encapsulant, air exits the mold through the vent 20. The air enters the vent 20 through the inside end 21 of the vent, and exits the vent 20 through the outside end 22 of the vent. The inside end 21 and outside end 22 have the same width.

In many cases, the air vent size is too small. Such undersized vents are easily blocked by mold flashes, which are difficult to remove during mold cleaning. According to a first conventional technique for improving venting, the air vents may be deepened (increased in height) or widened to increase the cross-sectional area of the vent. Unfortunately, deepening the air vent results in severe mold bleeding outside the mold cavity, which makes removing of unwanted plastic (flash) from the final product very difficult. Also, the size of the vent is limited by the pitch of the leads on the leadframe; the vent cannot be so large as to overlap one of the leads.

According to a second technique, the injection pressure of the encapsulant may be increased while filling the mold. Increasing injection pressure has an effect similar to deepening the air vent. Further, the bonding wires in the integrated circuit were observed to form short circuits due to the high filling pressure.

According to a third technique, the air vents may be cleaned frequently to avoid clogging by the mold compound. Frequent air vent cleaning improves venting, but is impractical, because each cleaning process takes up to about an hour to perform. This translates into loss of production capacity and increased operating costs.

An improved method for venting a mold is desired.

SUMMARY OF THE INVENTION

The present invention is a mold, and a method for forming the mold. At least one vent hole is formed in the mold. The vent hole is positioned to allow egress of air from the mold. The vent hole has an inside end and an outside end. The vent hole has a cross section that increases in area from the inside end to the outside end.

Additional aspects of the invention include a method for encapsulating an integrated circuit, and a circuit formed by the method. A mold is provided having at least one vent hole that allows egress of air. The vent has an inside end and an outside end. The vent has a cross section that increases in area from the inside end to the outside end. The integrated circuit is placed within the mold. A material to be molded is injected into the mold to encapsulate the integrated circuit.

DETAILED DESCRIPTION

Figure 2:
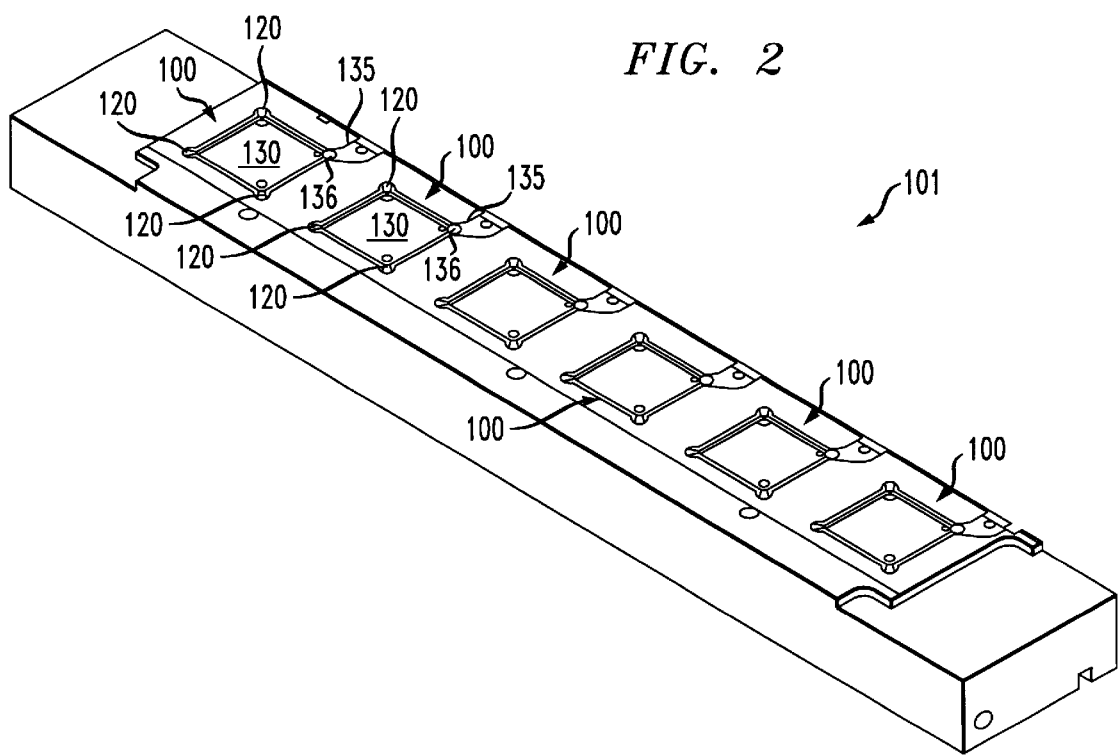
FIG. 2 is an isometric view of a bottom half of a mold according to the present invention, for encapsulating an integrated circuit
Figure 3A:
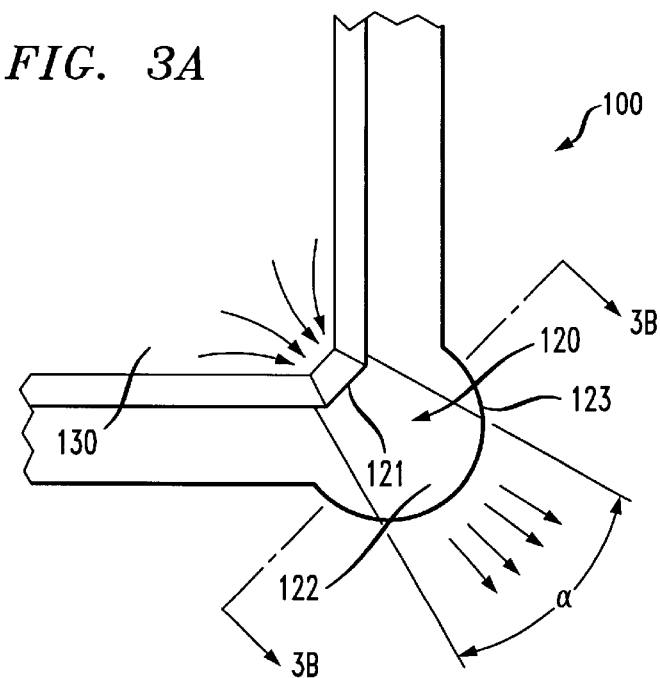
FIG. 3A is a top plan view of a corner of the mold of FIG. 2.
Figure 3B:
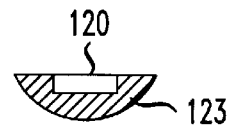
FIG. 3B is a cross sectional view of the corner of the mold shown in FIG. 3A, taken along section line 3B—3B of FIG. 3A.
Figure 4:
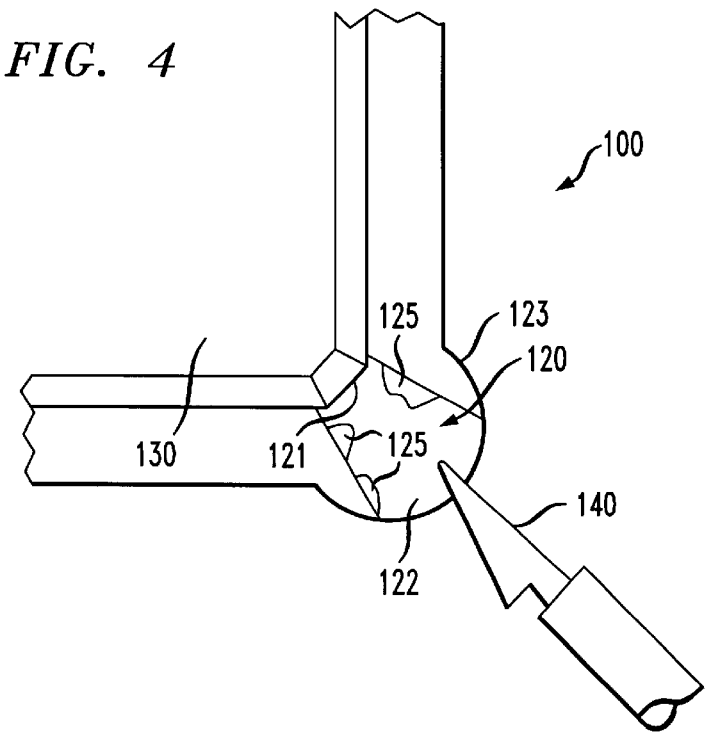
FIG. 4 shows removal of flashes from the mold shown in FIG. 2.

FIGS. 2–4 show an exemplary mold configuration according to the present invention. FIG. 2 is an isometric view of a bottom half of an exemplary mold assembly 101 according to the present invention, for encapsulating an integrated circuit 152 (shown in FIG. 5). A corresponding top mold half (not shown) is included. During a molding operation, the top and bottom halves of mold assembly 101 are clamped together, with an integrated circuit 152 and lead frame 156 (shown in FIG. 5) enclosed within the main cavity 130 of each mold 100.

Referring again to FIG. 2, the exemplary mold assembly 101 includes six individual molds 100, but any desired number of molds 100 may be included in a mold assembly. In the example, all of the molds 100 are identical to each other.

Figure 5:
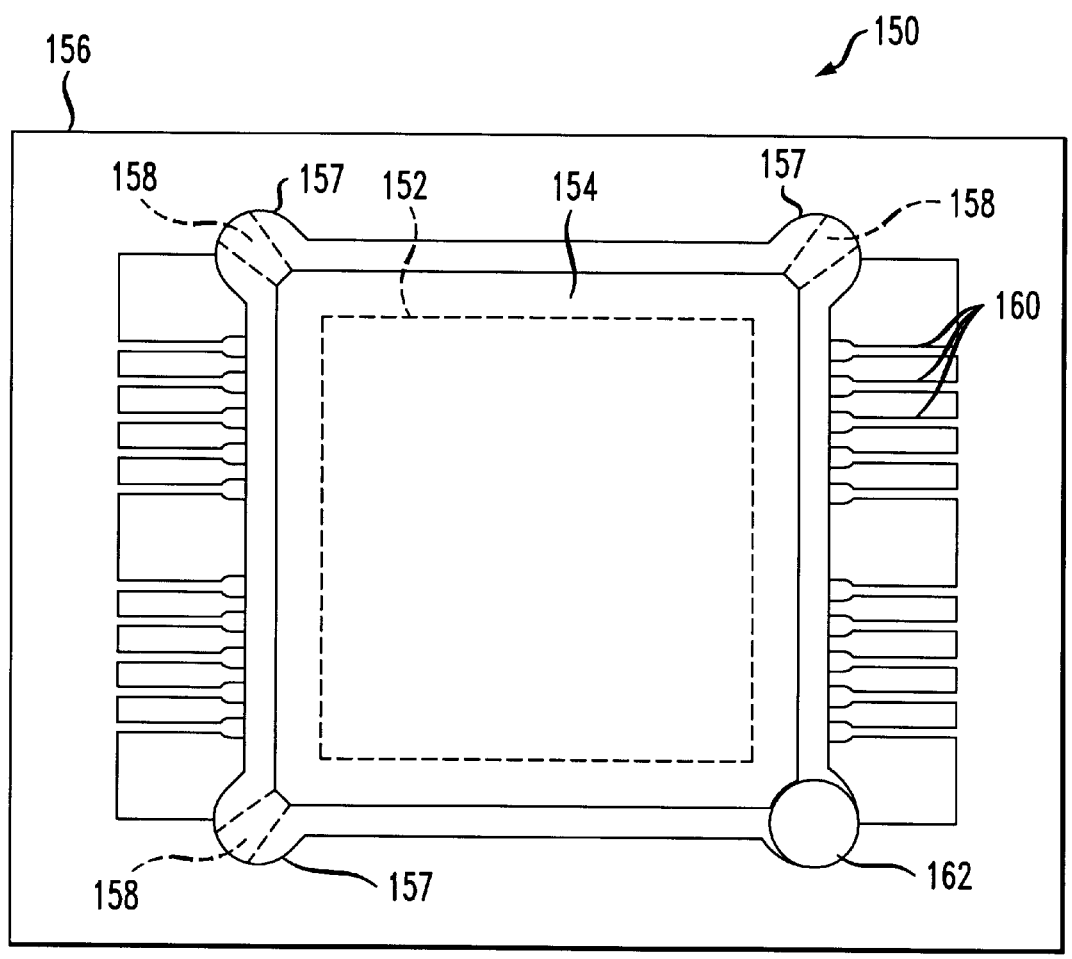
FIG. 5 is a top plan view of an integrated circuit assembly encapsulated in the mold shown in FIG. 2.

The molds 100 are used for encapsulating an integrated circuit 152 on a leadframe 156 (shown in FIG. 5). Each mold 100 has a main cavity 130 that receives the integrated circuit chip 152 and the central portion of the lead frame 156. One corner of the mold 100 has a mold flow gate 135 for receiving the encapsulant material 154 to be molded. The mold flow gate 135 has a well 136 that receives the encapsulant. Although the exemplary mold flow gate 135 is in a corner of the mold 100, the mold flow gate may be located elsewhere, for example at a center of a side of the mold.

Each mold 100 of FIG. 2 has at least one vent hole 120 that allows egress of air that is displaced by the encapsulant. The vent 120 fans outward between an inside end 121 and an outside end 122 (best seen in FIGS. 3A and 4). The vent 120 has a cross section that increases in area from the inside end 121 to the outside end 122. The width of the vent 120 also increases in area from the inside end 121 to the outside end 122. In the exemplary mold 100, a fan-out angle $\alpha$ of 10 degrees is used, but other fan-out angles are contemplated. The exemplary vent has a width of 0.70 mm at its inside end 121, and a depth of 0.035 mm. Other vent sizes may be used within any constraints imposed by the location of leads at the corner of the leadframe 156.

The air vent 120 of exemplary mold 100 has a cross section (shown in FIG. 3B) that is substantially rectangular. Any vent hole in the shape of a truncated triangular prism, a trapezoidal prism or a frustum may be used. The shape of the exemplary vent hole 120 is substantially a trapezoidal prism having two sides that are rectangles, a trapezoidal top, and a trapezoidal bottom. The trapezoidal bottom is best seen in FIGS. 3A and 4.

Alternatively, the shape of the vent hole may be substantially a truncated pyramid (not shown) in which the depth of the vent varies, or a truncated cone (not shown), in which case, the cross section of the vent would be circular. If the vent is only formed in one half of the mold, the vent may be a portion of a cone, such as a half cone. The vent may be a portion of a cone subtending an angle of less than 180 degrees about the longitudinal axis of the vent hole. Alternatively, the vent hole may have a cross section that is elliptical, or a portion of an ellipse.

Figure 1:
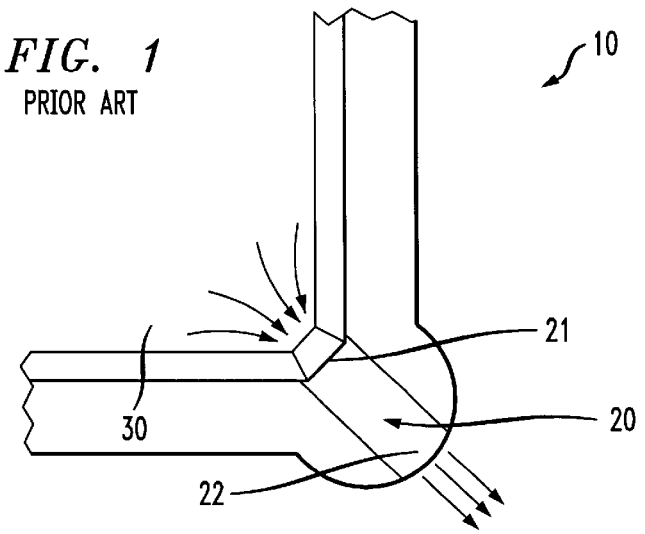
FIG. 1 is a top plan view of a comer of a conventional mold for encapsulating an integrated circuit.

The exemplary vent 120 need not increase the size of the inside end 121 of the vent, relative to a conventional vent (such as that shown in FIG. 1). A small width at the inside end 121 is desirable, because increasing the width of the inside end of the vent could result in interference between the vent and the leads of the lead frame, if the corner external leads lie close to the air vent. By maintaining a small width at the inside end 121 of the vent, small pitch between leads at the corners can be accommodated. In the exemplary embodiment of the invention, by increasing the cross sectional area of the outside end of the vent 120, removal of mold flash during mold cleaning is made much easier. By fanning out the vent 120, the vents can be cleaned more easily without increasing filling pressure, increasing the depth of the vent, or requiring more frequent cleaning.

The fanned out vent 120 is simple and inexpensive to implement, and does not require any expensive machining technology to fabricate the mold 100. If the mold 100 is cast, the vent 120 is included in the casting. If the mold 100 is machined, then vent 120 is easily formed using conventional milling machines and the like. Further, a pre-existing mold can be easily machined to include the fanned-out vent 120.

Reference is again made to FIG. 2. Preferably, at least one vent hole 120 is positioned at a corner 123 of the mold 100. In the exemplary embodiment, there are three vents 130 at three different corners of the mold 100. The provision of three vents 120 at three corners 123 allows air to egress uniformly from different portions of the mold 100, so that there is less likelihood of the clogging of a single vent deteriorating the filling of the mold. Using the exemplary mold 100, the mold is filled with the material to be molded, so as to displace substantially all air from the mold.

A method according to the invention for encapsulating an integrated circuit 152 includes the step of providing a mold 100 having at least one vent hole 120 that allows egress of air. The vent 120 has an inside end 121 and an outside end 122. The vent 120 has a cross section that increases in area from the inside end 121 to the outside end 122.

The integrated circuit chip 152 is bonded to a lead frame 156 using a known technique such as wire bonding. The assembly including the integrated circuit 152 and the lead frame 156 is placed within the mold 100. The top and bottom half of the mold assembly 101 are clamped together. The encapsulant material 154 to be molded is injected into the mold 100 to encapsulate the integrated circuit 152. The encapsulant material may be, for example, a thermoplastic molding compound or a resin. An exemplary resin is Novolac epoxy compound, but any suitable encapsulant may be used.

After the injection process is completed and the encapsulant allowed to solidify, the halves of mold 100 are opened and the encapsulated integrated circuit assembly 150 is removed.

FIG. 4 shows an advantage of a mold according to the invention. As noted above, the air vent may pick up mold flashes (undesired pieces of encapsulant that are formed while encapsulating a circuit). The mold 100 is easily cleaned of flashes 125 by inserting a tool 140 into the outside end 122 of the vent 120, and removing the mold flashes through the outside end of the vent. The present invention also facilitates the removal of mold flashes by mechanical brushing, either in manual or automatic mode. Alternatively, other suitable tools may be used for removal of mold flashes. Because the air vent 120 increases in width towards the outside end 122 thereof, tools 140 are easily inserted and flashes 125 are easily removed.

FIG. 5 is a top plan view of an exemplary integrated circuit 152 encapsulated by a method according to the invention. The integrated circuit 152 is placed within a mold, such as mold 100. The mold 100 has at least one vent hole 120 that allows egress of air, the vent having an inside end 121 and an outside end 122, wherein the cross section of the vent increases in area from the inside end to the outside end. An encapsulant material is injected into the mold 100 to encapsulate the integrated circuit. The mold 100 is filled with the encapsulant material 154, so as to displace substantially all air in the mold from the resulting encapsulated circuit assembly 150. The resulting assembly 150 is substantially free from any voids or pores in the encapsulant material 154.

Although the exemplary integrated circuit is wire bonded to a lead frame, a method and mold according to the invention may also be used for other types of chip packages, such as flip-chip packages, micro ball grid array packages and the like.

Although the exemplary mold assembly 110 has a plurality of identical molds 100, one of ordinary skill in the art could readily construct a mold assembly (not shown) according to the invention, in which the molds differ in shape from each other to accommodate different integrated circuits.

Although the invention has been described in terms of exemplary embodiments, it is not limited thereto. Rather, the appended claim should be construed broadly, to include other variants and embodiments of the invention which may be made by those skilled in the art without departing from the scope and range of equivalents of the invention.

What is claimed is:

1. An integrated circuit encapsulated by a method that comprises the steps of:

providing a mold having at least one vent hole that allows egress of air, said vent having an inside end and an outside end, said vent having a cross section that increases in area from the inside end to the outside end, and wherein the outside end of the vent hold has a width that is greater than a width of the inside end of the vent;

placing the integrated circuit within the mold; and injecting a material to be molded into the mold to encapsulate the integrated circuit, wherein the step of injecting includes filling the mold with the material to be molded, so as to displace substantially all air from the mold.

2. The integrated circuit of claim 1, wherein the material to be molded is one of the group consisting of a molding compound and a resin.

3. The integrated circuit of claim 1, wherein the at least one vent hole is positioned at a corner of the mold.

4. An integrated circuit encapsulated within a mold, comprising:

a mold having at least one vent hole that allows egress of air, said vent having an inside end and an outside end, said vent having a cross section that increases in area from the inside end to the outside end;

an integrated circuit within the mold; and a material to be injected into the mold to encapsulate the integrated circuit, wherein said injecting includes filling the mold with the material to be molded, so as to displace substantially all air from the mold, the mold containing flashes within said vent having a cross section that increases in area from the inside end to the outside end.

* * * * *